(12) United States Patent
Park (10) Patent No.: US 11,242,096 B2
(45) Date of Patent: Feb. 8, 2022

(54) STEERING APPARATUS OF VEHICLE (71) Applicants: HYUNDAI MOTOR COMPANY, Seoul (KR); KIA MOTORS CORPORATION, Seoul (KR)

(72) Inventor: Young Uk Park, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 189 days.

(21) Appl. No.: 16/601,774

(22) Filed: Oct. 15, 2019

(65) Prior Publication Data
US 2020/0398904 A1 Dec. 24, 2020

(30) Foreign Application Priority Data

Jun. 18, 2019 (KR) .................. 10-2019-0071935

(51) Int. Cl.
*B62D 27/06* (2006.01)
*B62D 21/09* (2006.01)
*B62D 27/02* (2006.01)
*B62D 3/12* (2006.01)

(52) U.S. Cl.
CPC ............ *B62D 27/065* (2013.01); *B62D 3/12* (2013.01); *B62D 21/09* (2013.01); *B62D 27/023* (2013.01)

(58) Field of Classification Search
CPC .... B62D 27/065; B62D 21/09; B62D 27/023; B62D 3/12; B62D 21/11; B62D 3/126; B62D 21/00

See application file for complete search history.

(56) References Cited

U.S. PATENT DOCUMENTS

| 1,417,149 | A | * | 5/1922 | Dodds | ................. F22B 7/16 411/379 |
|---|---|---|---|---|---|
| 3,403,931 | A | * | 10/1968 | Crain | ................. F16L 23/08 285/334.2 |
| 4,709,591 | A | * | 12/1987 | Emori | ................. B62D 3/12 74/422 |
| 2005/0079012 | A1 | * | 4/2005 | Mochizuki | ............ F16L 21/065 403/408.1 |
| 2007/0243040 | A1 | * | 10/2007 | Chen | ................. F16B 39/282 411/161 |

(Continued)

FOREIGN PATENT DOCUMENTS

KR 10-2016-0106807 A 9/2016

*Primary Examiner* — Darlene P Condra
(74) *Attorney, Agent, or Firm* — Lempia Summerfield Katz LLC (57) ABSTRACT A steering apparatus of a vehicle includes a plurality of coupling portions formed in a rack housing of a gear box and coupled to mounting portions of a vehicle body; and a nut member having a support surface and installed in each of the mounting portions of the vehicle body. In particular, each of the plurality of coupling portions has a seating surface formed as a curved surface with a predetermined curvature, and the seating surfaces are respectively seated on the support surface of the nut member installed in each of the mounting portions of the vehicle body such that the rack housing of the gear box is fixed to the vehicle body by a bolt which passes through each of the plurality of coupling portions to be engaged with the nut member of each of the mounting portions.

8 Claims, 5 Drawing Sheets

(56) References Cited

U.S. PATENT DOCUMENTS

2009/0067948 A1\* 3/2009 Chung .................... F16B 39/12
 411/429
2010/0175491 A1\* 7/2010 Fujimoto ................. B62D 7/08
 74/422

\* cited by examiner

STEERING APPARATUS OF VEHICLE

CROSS-REFERENCE TO RELATED APPLICATION

This application claims priority to and the benefit of Korean Patent Application No. 10-2019-0071935, filed on Jun. 18, 2019, the entire contents of which are incorporated herein by reference.

FIELD

The present disclosure relates to a steering apparatus of a vehicle. More particularly, it relates to a steering apparatus of a vehicle in which a gear box is capable of being accurately installed on a vehicle body.

BACKGROUND

The statements in this section merely provide background information related to the present disclosure and may not constitute prior art.

Generally, a steering apparatus is a device for changing a driving direction of a vehicle according to an intent of a driver and for rotating a wheel so as to allow the vehicle to drive in a desired direction of a driver.

In a known steering apparatus, when the driver manipulates a steering wheel, a force (i.e., a steering torque) is delivered to the wheel through a gear box having a rack-pinion structure to thereby rotate the wheel of the vehicle.

Recently, an electric steering apparatus has been developed and widely used. The electric steering apparatus assists the steering torque of the driver through a motor to allow the driver to easily manipulate a steering wheel.

For the delivery of the steering torque from the driver and an auxiliary steering torque generated by the motor in the electric steering apparatus, multiple components are involved. The components may include a steering column installed below the steering wheel, a gear box for converting a rotational force delivered from the steering column into a forward force to change a direction of the wheel, and a universal joint for delivering the rotational force delivered from the steering column to the gear box.

Here, the gear box may include a pinion gear for receiving the rotational force from the universal joint, and a rack bar on which a rack is formed. A pinion gear is engaged with the rack.

In such a gear box, when the pinion gear is rotated, the rack bar performs a direct motion in a left-right direction due to the rack. In this case, an acting force due to the direct motion of the rack bar is delivered to the wheel through a tie rod and a ball joint to change the direction of the wheel.

Meanwhile, in the steering apparatus, a rack housing is coupled to the vehicle body, specifically, a sub-frame of the vehicle. In the case of the sub-frame, since it is difficult to precisely control a height and an angle of a mounting portion due to a characteristic of a manufacturing process, the rack housing which is coupled to the sub-frame is bent or damaged such that there is a problem in that noise and a steering failure occur.

Figure 6:
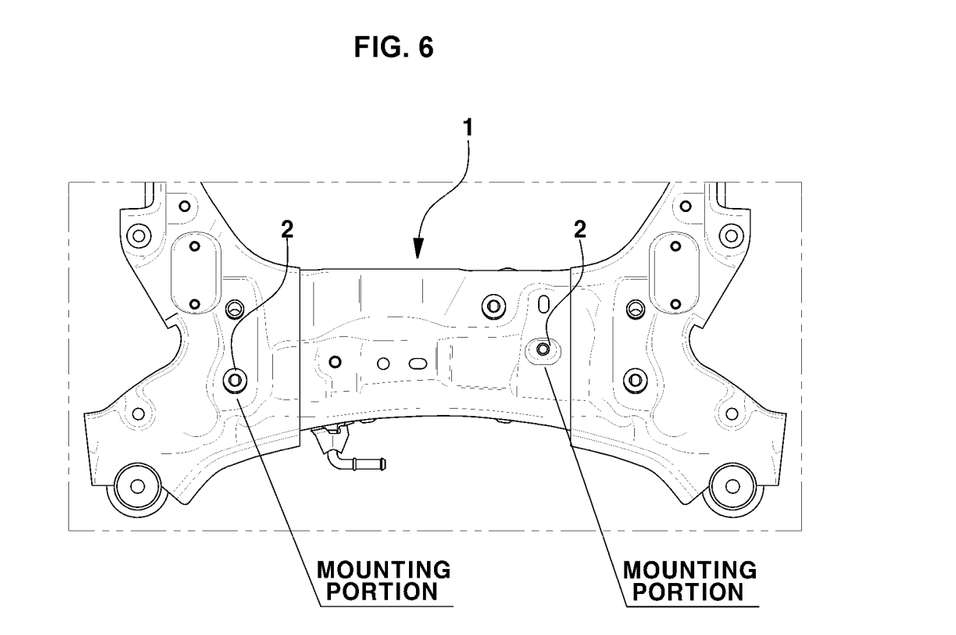
FIG. 6 is a plan view illustrating a sub-frame to which a rack housing of a gear box is coupled.

FIG. 6 is a plan view illustrating a sub-frame 1 that includes a mounting portion to which a rack housing of a gear box is coupled.

As shown in the drawing, a plurality of mounting portions are set in the sub-frame 1, and a pipe-shaped nut member 2 is installed in each of the plurality of mounting portions.

Figure 7:
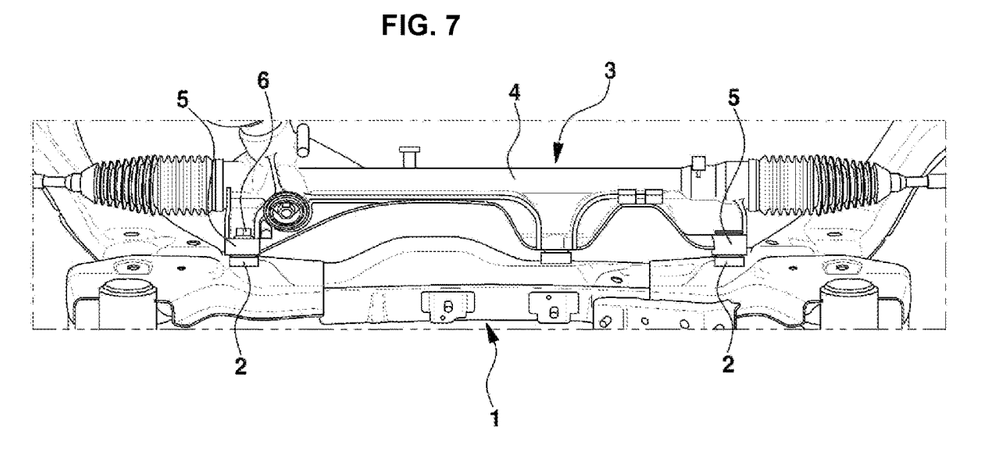
FIG. 7 is a perspective view illustrating a state in which the rack housing of the gear box is mounted on the sub-frame.
Figure 8:
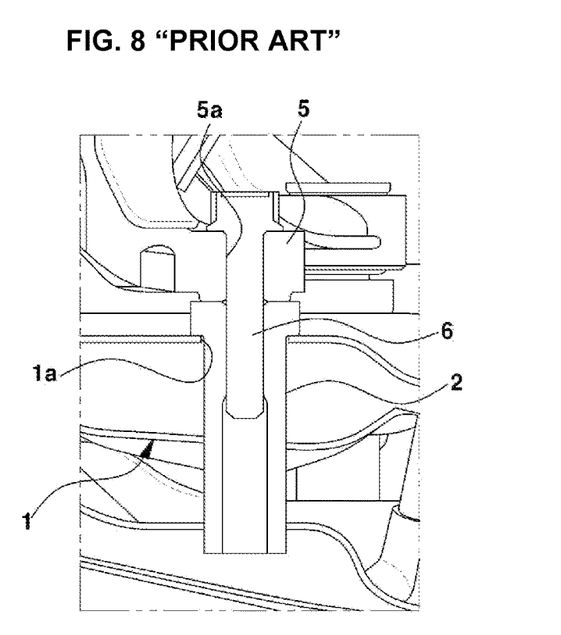
FIG. 8 is a cross-sectional view illustrating a mounting structure of a gear box in a steering apparatus according to the related art.

FIG. 7 is a diagram illustrating a state in which a gear box 3 is mounted on the sub-frame 1, and FIG. 8 is a cross-sectional view illustrating a mounting structure. As shown in FIG. 8, the pipe-shaped nut member 2 (e.g., a "pipe nut") is welded and fixed to each of the plurality of mounting portions of the sub-frame 1, and a coupling portion 5 is formed on a rack housing 4 of the gear box 3 to be coupled to each of the plurality of mounting portions of the sub-frame 1 through a bolt 6.

The nut member 2 is formed by machining a screw thread on an inner circumferential surface of a hollow. A hole 1a is formed in each of the plurality of mounting portions of the sub-frame 1, and the nut member 2 is inserted into the hole 1a and fixed thereto by welding.

The coupling portion 5 of the rack housing 4 is formed at a position corresponding to each of the plurality of mounting portions of the sub-frame 1. In a state in which the coupling portion 5 is placed on the nut member 2 of a corresponding mounting portion, a coupling hole 5a of the coupling portion 5 is aligned with the hollow of the nut member 2, the bolt 6 passes from an upward side to be inserted into the hollow of the nut member 2 through the coupling hole 5a, and then the bolt 6 is screw-engaged with an interior of the hollow of the nut member 2.

In this case, since the plurality of mounting portions of the sub-frame 1 and a plurality of coupling portions 5 of the rack housing 4 are provided, one hollow of the nut member 2 among the plurality of mounting portions is first aligned with one coupling hole 5a among the plurality of coupling portions 5 to set a reference hole, one bolt 6 is engaged in the reference hole in advance, and then the remaining bolts 6 are engaged in the remaining mounting portions and the remaining coupling portions.

Figure 9:
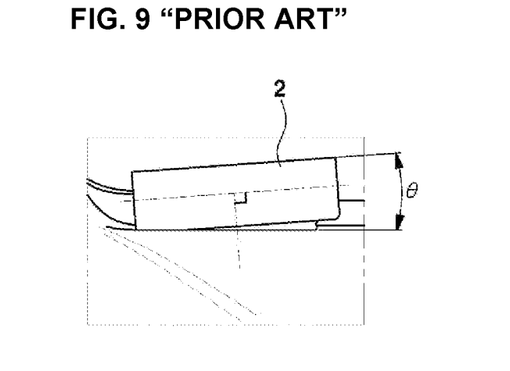
FIG. 9 is a diagram describing a deviation of squareness within a tolerance range in a single item of a nut member according to the related art.

However, as shown in FIG. 9, we have found that in a state in which the nut member 2 is installed in the mounting portion of the sub-frame 1, a deviation of the nut member 2 may occur due to various causes. For example, when the nut member 2 is welded to the mounting portion of the sub-frame 1, a deviation may occur within a tolerance range (an angle of deviation: θ), and an angular deviation may occur due to thermal deformation and the like.

Figure 10:
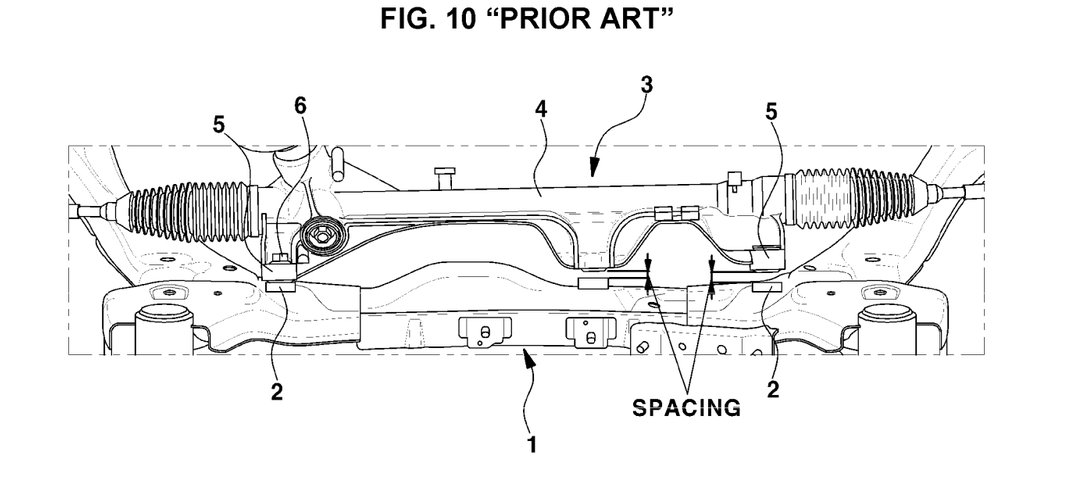
FIG. 10 is a diagram illustrating a state in which a spacing occurs in another mounting portion after the gear box is mounted in a reference hole in the steering apparatus according to the related art.

As shown in FIG. 10, we have also discovered that owing to a mounting seat surface tolerance after the gear box 3 is mounted on the reference hole, a spacing may occur on another mounting portion. As shown in FIG. 10, when the coupling portion 5 of the rack housing 4 is spaced apart from the nut member 2 in the mounting portion, damage may occur in the vicinity of the coupling portion 5 of the rack housing 4 during bolting, and friction fluctuation is caused due to deformation of the rack housing 4 such that a steering feeling may be adversely affected.

SUMMARY

In one aspect, the present disclosure provides a steering apparatus of a vehicle in which a gear box is capable of being accurately installed on a vehicle body without using a separate component for absorbing a clearance with no occurrence of a spacing on the vehicle body.

In one form, a steering apparatus of a vehicle includes: a gear box having a rack housing, where a plurality of coupling portions are formed in the rack housing and respectively coupled to mounting portions of a vehicle body of the vehicle; and a nut member having a support surface and installed in each of the mounting portions of the vehicle body. In particular, each of the plurality of coupling portions has a seating surface formed as a curved surface with a predetermined curvature, and the seating surfaces are respectively seated on the support surface of the nut member installed in each of the mounting portions of the vehicle body. In one form, the rack housing of the gear box is fixed to the vehicle body by a bolt which passes through each of the plurality of coupling portions and engages with the nut member of each of the mounting portions.

In another form of the present disclosure, the nut member may include: a body portion which has a screw thread formed on an inner circumferential surface of the body portion and which is fixed to the vehicle body; and a head portion integrally formed with the body portion and having the support surface formed on an upper surface of the head portion.

In other form of the present disclosure, the seating surface may be a convex curved surface formed on a lower surface of each of the plurality of coupling portions. In particular, when the seating surface of each of the plurality of coupling portions is seated on the support surface of the nut member and before the bolt is engaged with the nut member, the plurality of coupling portions of the rack housing may be rotatable with respect to the nut members of the mounting portions.

In another aspect of the present disclosure, the support surface of the nut member and the seating surface of each of the plurality of coupling portions may be curved surfaces having the same curvature.

In another form of the present disclosure, the bolt may have a flange portion which extends in a radial direction of the bolt, and a coupling surface is formed on a lower surface of the flange portion and seated on a bonding surface formed on an upper surface of each of the plurality of coupling portions. In particular, the coupling surface and the bonding surface may be formed as curved surfaces each having a predetermined curvature.

In other aspect of the present disclosure, the coupling surface may be formed as a convex curved surface and the bonding surface may be formed as a concave curved surface such that the bolt may be tiltable with respect to the plurality of coupling portions in a state in which the coupling surface is seated on and bonded to the bonding surface.

In one form of the present disclosure, the predetermined curvature of the coupling surface of the flange portion is the same as the predetermined curvature of the bonding surface of the plurality of coupling portions.

In another form of the present disclosure, an inner diameter of a coupling hole formed in each of the plurality of coupling portions may be greater than an outer diameter of the body portion of the bolt.

In other form of the present disclosure, the coupling hole formed in each of the plurality of coupling portions may have a shape of which inner diameter gradually increases toward an upper side of the coupling hole.

Other aspects and exemplary forms of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout this disclosure, when an element is referred to as "comprising" a component, it refers that the element can further include other components, not excluding the other components unless specifically stated otherwise.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes will be determined in part by the particular intended application and use environment.

Figure 1:
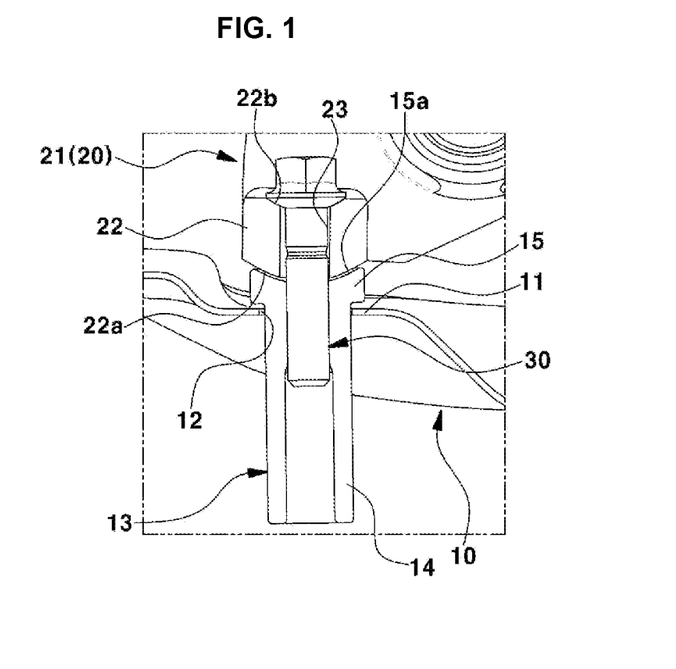
FIG. 1 is a cross-sectional view illustrating a mounting structure of a gear box in a steering apparatus according to one form of the present disclosure.

FIG. 1 is a cross-sectional view illustrating a mounting structure of a gear box in a steering apparatus according to one form of the present disclosure. A reference numeral 21 denotes a rack housing of a gear box 20, and a reference numeral 10 denotes a sub-frame which is a portion of a vehicle body on which the rack housing 21 is mounted.

Figure 2:
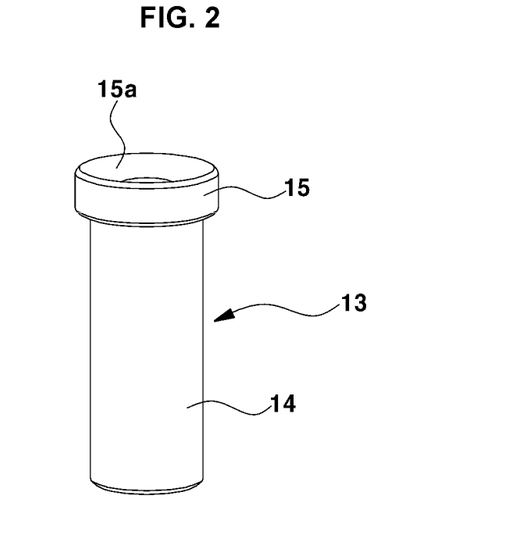
FIG. 2 is a perspective view illustrating a nut member for mounting a gear box in the steering apparatus according to one form of the present disclosure.
Figure 3A:
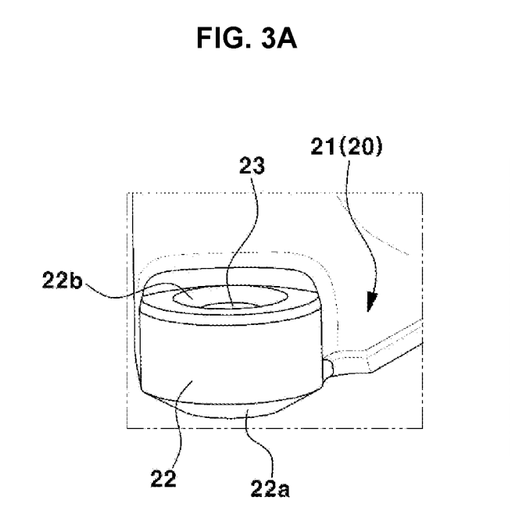
FIGS. 3A and 3B show perspective views respectively illustrating a coupling portion of a rack housing in the steering apparatus according to one form of the present disclosure.
Figure 3B:
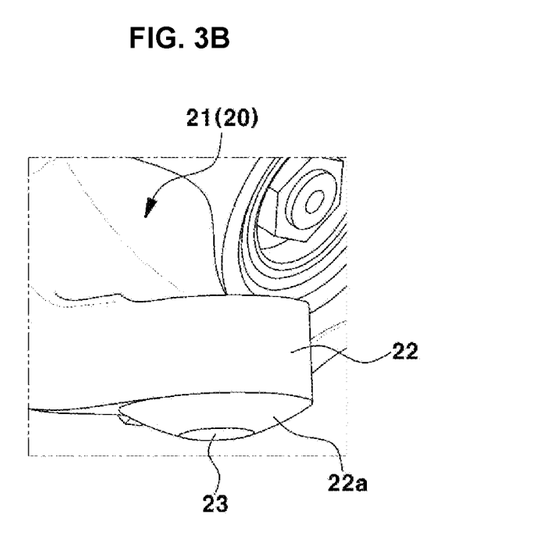

FIG. 2 is a perspective view illustrating a nut member 13 for mounting a gear box in the steering apparatus according to one form of the present disclosure, and FIG. 3 shows perspective views illustrating a coupling portion 22 of the rack housing 21 in the steering apparatus according to one form of the present disclosure.

Figure 4:
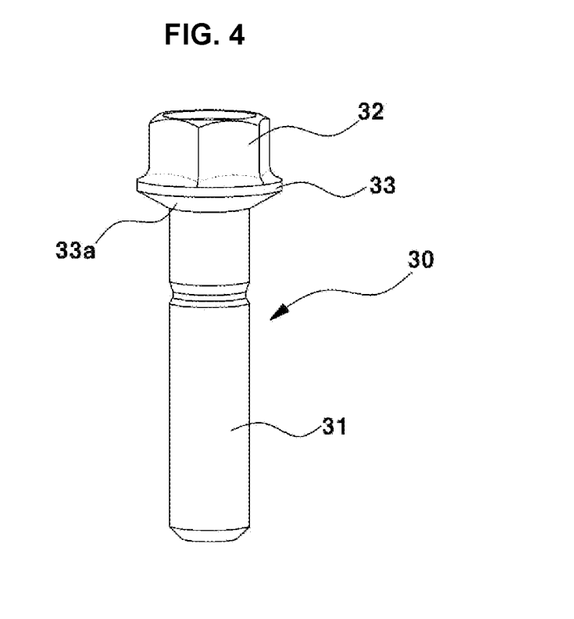
FIG. 4 is a perspective view illustrating a bolt for mounting the gear box in the steering apparatus according to one form of the present disclosure.

Further, FIG. 4 is a perspective view illustrating a bolt 30 for mounting the gear box in the steering apparatus according to one form of the present disclosure.

As shown in FIGS. 1 and 3, a coupling portion 22, which is mounted on and coupled to a mounting portion 11 of a vehicle body, specifically, the mounting portion 11 of the sub-frame 10, is formed on the rack housing 21 of the gear box 20.

The coupling portion 22 is a portion which is coupled to the mounting portion 11 of the sub-frame 10 by the bolt 30. The coupling portion 22 has a coupling hole 23 into which the bolt 30 is inserted to pass through.

A mounting hole 12 is formed in the mounting portion 11 of the sub-frame 10, and the nut member 13 is inserted to pass through the mounting hole 12.

Here, the sub-frame 10 may be made of a weldable material such as a steel alloy.

In a state in which the nut member 13 is inserted to pass through the mounting hole 12, the nut member 13 is welded and fixed to a sub-frame portion around the mounting hole 12, i.e., the mounting portion 11 around the mounting hole 12, and a screw thread is formed on an inner circumferential surface of the nut member 13 so as to allow the bolt 30 to be engaged with the nut member 13.

The nut member 13 may employ a nut member which is manufactured by forging a weldable material such as a steel alloy. In a state in which the nut member 13 is welded to the sub-frame 10, the nut member 13 supports the coupling portion 22 of the rack housing 21, which is seated above the nut member 13.

As shown in FIG. 2, the nut member 13 may include a body portion 14 having a pipe shape of a predetermined diameter and a head portion 15 integrally formed at an end portion of the body portion 14 so as to have a shape extending in a radial direction.

In this case, the screw thread (not shown) for bolt engagement may be formed on an inner circumferential surface of at least a part of the body portion 14. In addition, the screw thread may be formed on an inner circumferential surface of the head portion 15.

In an exemplary form, in order to allow the bolt 30 which is engaged as described below to be rotated, the coupling hole 23, which is formed in the coupling portion 22 of the rack housing 21 and into which the bolt 30 is inserted to pass through, may have an inner diameter that is greater than an inner diameter of the hollow of the nut member 13 or an outer diameter of a body portion 31 as much as a predetermined size.

An inner diameter of the coupling hole 23 in the coupling portion 22 is made to be greater than the inner diameter of the hollow of the nut member 13 or the outer diameter of the body portion 31 of the bolt 30 as much as a predetermined size such that the bolt 30 inserted to pass through the coupling hole 23 may be relatively rotated and tilted in the coupling portion 22.

Further, the rack housing 21 may be manufactured by die casting aluminum and mounted on the sub-frame 10 by being engaged therewith by the bolt 30.

In the present disclosure, the coupling portion 22 of the rack housing 21 and the mounting portion 11 of the sub-frame 10 may be provided at a plurality of predetermined positions. In this case, the nut member 13 is installed in the mounting portion 11, and the coupling portion 22 is engaged with the nut member 13 by the bolt 30 in a state of being seated on the nut member 13 installed on the mounting portion 11.

The bolt 30 is inserted into the hollow of the nut member 13 and screw engaged with the nut member 13 through the screw thread, thereby serving to apply an axial force to the rack housing 21 in a state of being engaged with the nut member 13.

The bolt 30 may be formed of a material such as a steel alloy or the like. The bolt 30 includes the body portion 31 inserted into the inner circumferential surface of the nut member 13 and screw engaged therewith, a head portion 32 formed at an end portion of the body portion 31, and a flange portion 33 formed at a boundary between the body portion 31 and the head portion 32 in a shape extending in a radial direction.

Meanwhile, in the rack housing 21, a lower surface of the coupling portion 22 becomes a seating surface 22a which is seated on an upper side of the nut member 13, and the seating surface 22a of the coupling portion 22 may be formed as a convex curved surface having a predetermined curvature.

Further, an upper end surface of a head portion 15 in the nut member 13 becomes a support surface 15a which is bonded and supported in a state in which the seating surface 22a of the coupling portion 22 is seated. The support surface 15a, which is the upper end surface of the head portion 15 in the nut member 13, may be formed as a concave curved surface corresponding to the seating surface 22a of the coupling portion 22.

That is, the support surface 15a, which is the upper end surface of the head portion 15 in the nut member 13, may be formed as a concave curved surface having a predetermined curvature. In the rack housing 21, the seating surface 22a of the coupling portion 22 may be formed as a convex curved surface corresponding to the support surface 15a of the head portion 15.

More specifically, in the rack housing 21, the seating surface 22a of the coupling portion 22 may be a curved surface having a curvature that is the same as that of the support surface 15a of the head portion 15.

Further, the flange portion 33 of the bolt 30 is coupled in a state of being seated on an upper surface of the coupling portion 22 of the rack housing 21. A coupling surface 33a, which is a lower surface of the flange portion 33 in the bolt 30, may also be formed as a convex curved surface having a predetermined curvature.

In this case, in the rack housing 21, the upper surface of the coupling portion 22 becomes a bonding surface 22b which is bonded in a state in which the flange portion 33 of the bolt 30 is seated. The bonding surface 22b of the coupling portion 22 may be formed as a concave curved surface corresponding to the coupling surface 33a of the bolt 30.

Similarly, the bonding surface 22b of the coupling portion 22 may be formed as a concave curved surface having a predetermined curvature. In the bolt 30, the coupling surface 33a of the flange portion 33 may be formed as a convex curved surface corresponding to the bonding surface 22b of the coupling portion 22.

More specifically, in the bolt 30, the coupling surface 33a of the flange portion 33 may be a curved surface having a curvature that is the same as that of the bonding surface 22b of the coupling portion 22.

As a result, a predetermined curvature is applied to each of contact surfaces of the nut member 13 fixed to the sub-frame 10, the coupling portion 22 formed in the rack housing 21, and the bolt 30 for engaging the nut member 13 with the coupling portion 22 such that relative rotation, a tilting, and a position adjustment between parts being brought into contact with each other become possible.

More specifically, in a state in which the coupling portion 22 of the rack housing 21 is seated on the head portion 15 of the nut member 13, specifically, in a state in which the convex seating surface 22a of the coupling portion 22 in the rack housing 21 is seated on the concave support surface 15a of head portion 15 in the nut member 13, slip occurs between the seating surface 22a and the support surface 15a such that the coupling portion 22 of the rack housing 21 may be rotated with respect to the nut member 13.

With such rotation, an angle and inclination of the rack housing 21 may be adjusted with respect to the sub-frame 10 and the nut member 13 at the mounting portion 11.

Further, clearance absorption may be achieved in the plurality of mounting portions 11 through the above-described rotation.

That is, in each of the plurality of mounting portions 11 of the sub-frame 10, the angle and inclination of the rack housing 21 may be adjusted through the slip and rotation, and the coupling surface 33a, which is the lower surface of the flange portion 33 of the bolt 30, may also be rotated in a state of being bonded to the bonding surface 22b which is the upper surface of the coupling portion 22 of the rack housing 21.

As a result, according to one form of the present disclosure, relative rotation between the sub-frame 10 and the rack housing 21 in the mounting portion 11 may be possible without a separate member therebetween, and the rack housing 21 may be tilted relative to the sub-frame 10.

Further, the bolt 30 may be rotated and tilted relative to the coupling portion 22 of the rack housing 21.

Figure 5:
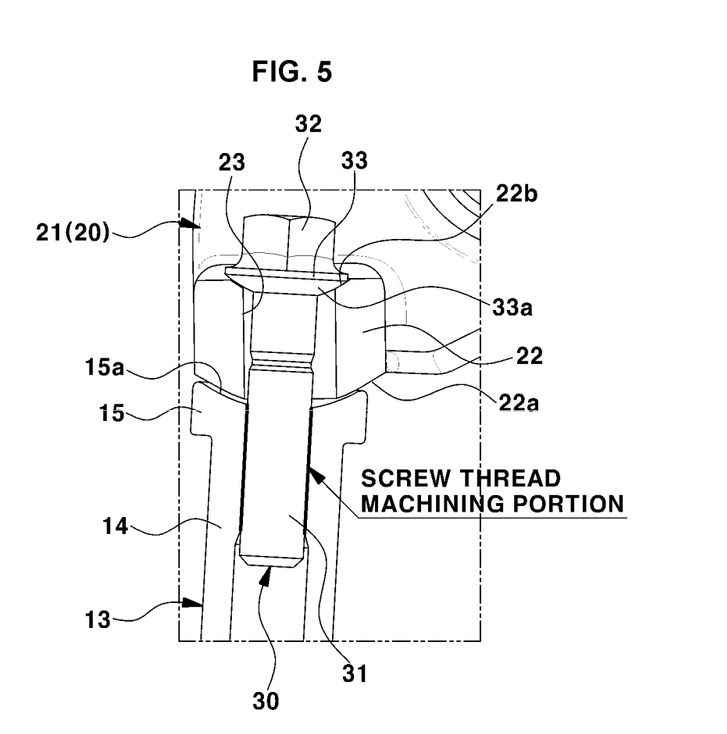
FIG. 5 is a cross-sectional view illustrating a mounting state in which a deviation and a clearance are compensated for in a gear box mounting structure of the steering apparatus according to one form of the present disclosure.

FIG. 5 is a cross-sectional view illustrating a mounting state in which a deviation and a clearance are compensated for in a gear box mounting structure of the steering apparatus according to one form of the form of the present disclosure that shows a state in which parts are rotated and tilted in the mounting portion 11 at an angle different from that of FIG. 1.

As shown in the drawing, in order to allow relative rotation between the bolt 30, the coupling portion 22 of the rack housing 21, and the nut member 13, the coupling hole 23, which is formed in the coupling portion 22 of the rack housing 21 and through which the bolt 30 is inserted to pass, may have an inner diameter that is greater than the inner diameter of the hollow of the nut member 13 and the outer diameter of the nut member 13 as much as a predetermined size.

Further, in an exemplary form, the coupling hole 23 of the coupling portion 22 in the rack housing 21 may have a shape of which inner diameter gradually increases toward an upper side of the coupling hole 23.

This is to prevent interference of the bolt 30 with other parts in rotating and tilting the bolt 30 when compensating for a deviation of an engagement axis, i.e., when compensating for a deviation between a hollow axis and a coupling hole axis of the nut member 13. As described above, in one form, the coupling hole 23 of the coupling portion 22 is formed in a shape of which diameter gradually decreases toward a downward direction so as to allow the bolt 30 screw engaged with the nut member 13 to be rotated and tilted in the coupling portion 22 of the rack housing 21.

Thus, in accordance with a steering apparatus according to one form of the present disclosure, a structure for mounting a gear box on a sub-frame allows relative rotation (tilting) of parts in a matching portion (contact portion) of the parts such that compensation for a clearance and a deviation of an engagement axis can be performed.

Further, owing to the mounting structure, even though a deviation of a nut member occurs in the sub-frame, it is possible to compensate for a clearance (spacing) in another mounting portion due to rotation of a rack housing in a mounting portion corresponding to a reference hole, and even though a deviation between a hollow axis of the nut member and a coupling hole axis of the rack housing occurs, it is possible to compensate for the deviation through a bolt tilting.

Therefore, owing to the mounting structure capable of absorbing a clearance between the mounting portions, it is possible to achieve a stable coupling between the rack housing of the gear box and the sub-frame in each of the mounting portions, and additional machining for preventing occurrence of a deviation can be omitted such that a production cost can be reduced.

Further, it is possible to prevent deformation of the rack housing and stress concentration on a contact portion through deviation absorption such that it is possible not only to maintain a normal axial engagement force but also to prevent damage to the rack housing. Moreover, it is possible to reduce or minimize an adverse affection due to friction, improve stability of a vehicle, and prevent a steering feeling from being degraded.

Although the forms of the present disclosure have been described in detail, the scope of the prevent present disclosure is not limited to these forms, and various modifications and improvements devised by those skilled in the art using the fundamental concept of the present disclosure fall within the scope of the present disclosure.

What is claimed is:

1. A steering apparatus of a vehicle, comprising:
   a gear box having a rack housing, a plurality of coupling portions formed in the rack housing and respectively coupled to mounting portions of a vehicle body of the vehicle; and
   a nut member having a support surface and installed in each of the mounting portions of the vehicle body,
   wherein each of the plurality of coupling portions has a seating surface formed as a curved surface with a predetermined curvature, and the seating surfaces are respectively seated on the support surface of the nut member installed in each of the mounting portions of the vehicle body,
   wherein the rack housing of the gear box is fixed to the vehicle body by a bolt which passes through each of the plurality of coupling portions and engages with the nut member of each of the mounting portions, and
   wherein the nut member includes:
   a body portion which has a screw thread formed on an inner circumferential surface of the body portion and which is fixed to the vehicle body; and a head portion integrally formed with the body portion and having the support surface formed on an upper surface of the head portion.

2. The steering apparatus of claim 1, wherein the seating surface is a convex curved surface formed on a lower surface of each of the plurality of coupling portions; and wherein when the seating surface of each of the plurality of coupling portions is seated on the support surface of the nut member and before the bolt is engaged with the nut member, the plurality of coupling portions of the rack housing are rotatable with respect to the nut members of the mounting portions.

3. The steering apparatus of claim 1, wherein the support surface of the nut member and the seating surface of each of the plurality of coupling portions are curved surfaces having the same curvature.

4. The steering apparatus of claim 1, wherein the bolt has a flange portion which extends in a radial direction of the bolt, and wherein a coupling surface is formed on a lower surface of the flange portion and seated on a bonding surface formed on an upper surface of each of the plurality of coupling portions, the coupling surface and bonding surface formed as curved surfaces each having a predetermined curvature.

5. The steering apparatus of claim 4, wherein the coupling surface is formed as a convex curved surface and the bonding surface is formed as a concave curved surface such that the bolt is tiltable with respect to the plurality of coupling portions in a state in which the coupling surface is seated on and bonded to the bonding surface.

6. The steering apparatus of claim 4, wherein the predetermined curvature of the coupling surface of the flange portion is the same as the predetermined curvature of the bonding surface of the plurality of coupling portions.

7. The steering apparatus of claim 4, wherein an inner diameter of a coupling hole formed in each of the plurality of coupling portions is greater than an outer diameter of the body portion of the bolt.

8. The steering apparatus of claim 7, wherein the coupling hole formed in each of the plurality of coupling portions has a shape of which inner diameter gradually increases toward an upper side of the coupling hole.

* * * * *